United States Patent
Otto

(10) Patent No.: US 8,240,998 B2
(45) Date of Patent: Aug. 14, 2012

(54) FLUID MOVEMENT DEVICE WITH METHOD

(76) Inventor: Paul Robert Otto, Birmingham, AL (US)

( * ) Notice: Subject to any disclaimer, the term of this patent is extended or adjusted under 35 U.S.C. 154(b) by 1076 days.

(21) Appl. No.: 12/152,239

(22) Filed: May 13, 2008

(65) Prior Publication Data

US 2009/0285667 A1 Nov. 19, 2009

(51) Int. Cl.
*F03B 7/00* (2006.01)
*F03D 1/02* (2006.01)
(52) U.S. Cl. .................. 416/183; 416/197 A
(58) Field of Classification Search .......... 415/71–75; 416/176–178, 183, 196 A, 197 A, 197 B, 416/197 R
See application file for complete search history.

(56) References Cited

U.S. PATENT DOCUMENTS

| | | | |
|---|---|---|---|
| 3,939,794 A | 2/1976 | Hull | |
| 3,942,372 A | 3/1976 | Ruiz-Fornells Gonzalez | |
| 3,958,897 A | 5/1976 | Connolly | |
| 3,974,396 A | 8/1976 | Schonball | |
| 4,236,866 A * | 12/1980 | Zapata Martinez | 415/4.4 |
| 4,381,901 A | 5/1983 | Labudde | |
| 4,418,880 A * | 12/1983 | de Waal | 244/199.1 |
| 4,545,771 A | 10/1985 | Iio | |
| 4,925,131 A | 5/1990 | Eickmann | |
| 5,051,213 A * | 9/1991 | Weske | 261/78.2 |
| 5,184,469 A | 2/1993 | Saitou | |
| 6,010,380 A | 1/2000 | Wollard | |
| 6,168,384 B1 | 1/2001 | Vanmoor | |
| 6,239,505 B1 | 5/2001 | Kao | |
| 6,283,808 B1 | 9/2001 | Lohmann | |
| 6,948,910 B2 | 9/2005 | Polacsek | |
| 7,001,229 B2 | 2/2006 | Kettelson | |
| 7,014,416 B2 | 3/2006 | Lund | |
| 7,154,190 B2 * | 12/2006 | Kaploun | 290/43 |
| 7,176,584 B1 | 2/2007 | Green | |
| 7,192,244 B2 | 3/2007 | Grande et al. | |
| 7,281,680 B2 | 10/2007 | Melkuti | |
| 7,357,622 B2 | 4/2008 | Corten et al. | |

\* cited by examiner

*Primary Examiner* — Edward Look
*Assistant Examiner* — Liam McDowell

(57) ABSTRACT

A rotatable impeller is a hollow conical/cylindrical stack, with at least one slanted/vertical side portion and at least one level of stack portions. Each impeller comprises at least one shape of airfoil/hydrofoil for thrust to propel, or pull, i.e., to draw in, vapor or fluid; plus a dynamic application utilizes a reverse operation to generate electricity from the kinetic energy of the flow of vapor or fluid. One airfoil/hydrofoil configuration of a stack impeller comprises serpentine rectangular segments positioned by internal rib members. Considered additional levels are enlarged copies of the first level of the stack impeller, positioned at an engineered distance from each level, and are considered to amplify propulsive or vacuum force; or for energy recovery to operate a dynamo generator.

3 Claims, 22 Drawing Sheets

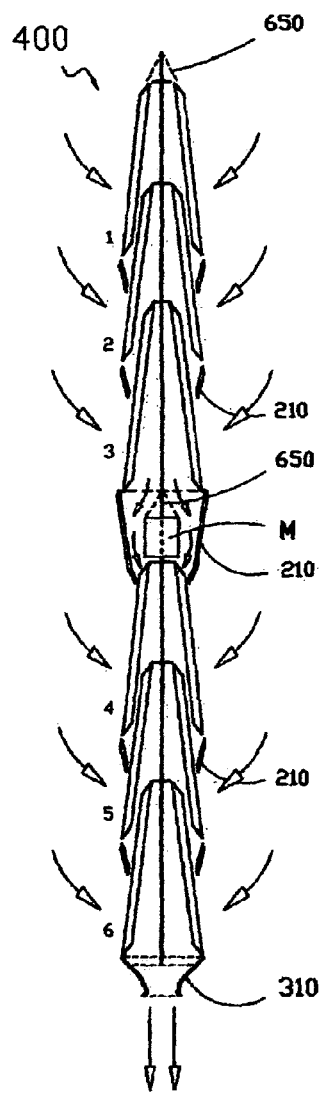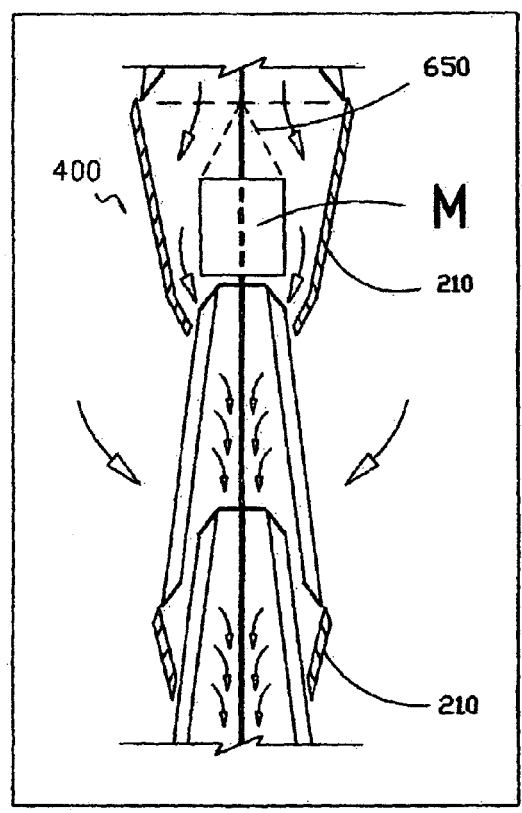
FIG. 15
FIG. 15A

FLUID MOVEMENT DEVICE WITH METHOD

DISCLOSURE OF THE INVENTION

Present design of an axial screw propeller is directed to a motorized device that moves vapor or fluid in separate operations while positioned on an axle shaft. More particularly, a present stack impeller with multiple levels, produces more than a same diameter propeller. The stack impeller specifically relates to a hollow, conical/cylindrical stack design to propel vapor or fluids without utilizing an encompassing ring called a duct or shroud. The motor rotates the device backward to produce a vacuum. A slanting, focusing structure positioned on the open end of a stack impeller, produces more forceful thrust but it reduces the output volume. At least one flared, circular structure is positioned on the open end of the stack impeller to collect a larger volume of flowing vapor or fluid to produce electricity. Electric power is produced by drawing energy from dynamic forces of inflowing vapor or fluid, to spin the present device positioned on a dynamo generator. If positioned on a generator shaft a stack impeller operates in reverse.

TECHNICAL FIELD

Comparison

Axial propellers (propulsion designs) perform two functions. Their first function is to propel (push). Their second function, a reverse operation, creates a vacuum (material extraction). The present invention relates, in general, to axial devices that operate in a clock-wise or counter-clock-wise direction.

The present impeller is serviceable to quietly move a volume of vapor or fluid in a focused and pressurized manner, plus to suck, i.e., draw up, a volume of vapor or fluid by creating a negative pressure (vacuum). The present impeller may operate in a reverse direction. These are the same functions axial propellers do. A stack impeller is a hollow, conical/cylindrical variation. An objective is to provide efficient impellers based on an advance in technology. This technology is associated with a deflection principle. Deflection develops thrust when utilized by propulsive machines; or the opposite, a vacuum (to draw up a volume). In the present case, the apparatus rotates on a central power shaft. The design has a benefit of utilizing energy forces from vapor or fluid flow to create electricity by rotating a dynamo. The engineered device, utilizing a new technology; is explained.

With the present impeller, the vapor or fluid moves into the center of the conical/cylindrical impeller, then through the open end, which is unique. Centrifugal drum designs are standard applications and their outward flow is opposite the present impeller direction. For a power production application, the flow direction is reversed, i.e., into an open conical/cylindrical end and out the side of a stack impeller. Another advance is to add multiple levels concentrically outside a core impeller. Vapor or fluid is smoothly directed to any number of subsequent levels which are axially positioned with respect to each other. An impeller design, utilizing this technical advance is considered safer while moving focused volumes at higher ejection speeds. This allows use of smaller pipes to carry vapor or fluid. Finally, when moving an equal volume of vapor or fluid, an impeller turns at a reduced rpm (revolutions per minute), which is considered economical.

An Electrical Application

A technological breakthrough is needed for generating power 24 hours a day. An engineered source may supply the power grid full-time. An impeller array can be positioned in a flowing river or the Gulf Stream to produce electricity. An additional concept utilizing geothermal steam for power was considered for 24 hour service.

The source of enormous energy is not in splitting the water molecule but in the movement of water. Rivers contain volumes that move at 4½ mph, 24 hours a day. The Gulf Stream is fifty miles wide and moves at 4 mph. When anchored in a water stream an array of impeller-based turbines can rotate dynamos. Stack impellers transform kinetic energy effectively; therefore a dynamo rotates strongly utilizing in-flowing water. The benefit is producing more electricity with a technology advance. Electricity development is the invention's focus.

Using flowing water to generate power is limited to water turbine's located within reservoir dams that contain a non-moving pool of water. This is good but the technology could be improved.

Engineering

Engineering the stack impeller was first accomplished. A shape that is slick, i.e., aerodynamic or hydrodynamic, while minimizing an effect on flow was needed. Reducing drag and vortex from a shape is resolved in the present invention. Propeller designs are considered disruptive to flowing vapor or fluids. Paddle wheel propulsion was examined but is not efficient. The efficiency solution of the stack impeller applies an advance in technology. The solution provides higher output without a large diameter implement, which resists rotation proportionally. Human-powered applications require the invention to be efficient and easy to rotate. Operation of the present impeller will be utilizing multiple levels to achieve the goal.

Propeller devices for airplanes have been made with wood material such as Ash or Sitka Spruce (due to strength and density). Historically these rigid propeller blades have a helical shape. A new development in 1942 was the variable-pitch mechanism for blades to pivot utilizing an apparatus inside a propeller hub. This development was utilized on Flying Fortresses in World War II to "feather" blades on engines that were not running. Today, variable-pitch designs permit rotors (rotating wings) to be used for helicopter mechanisms.

In the future, an engineered impeller will prove more versatile, plus supersede the predecessor propeller design to move vapor or fluid. An engineered stack impeller is an advanced technology. The present invention produces more thrust or vacuum compared to a propeller design when rotating at the same speed. The configuration can be varied for new applications.

Approaches to overcome propulsion inadequacies are addressed by many patents over the years. The approaches had minor changes, like surrounding propeller blades with a cylindrical duct called a shroud, to improve propulsion. Next, examples disclose solution attempts.

Power production examples are first. An attempt to resolve power generation inadequacies includes the Schonball U.S. Pat. No. 3,974,396; issued Aug. 10, 1976, which stated—"An electric generator arrangement has at least two wind or water wheels rotatably mounted on a common stationary shaft and coupled such that they rotate in opposite directions with a given ratio or a progressively variable ratio. The wheels carry the two cooperating parts of a first generator and may also each carry the rotor of a second or third generator cooperating with a stator on the shaft, the field excitation or loading of the second and/or third generator being used to control the speed."

An attempt to resolve power generation inadequacies includes the Lund U.S. Pat. No. 7,014,416; issued Mar. 21, 2006, which stated—"A wind turbine uses a support tower with a rotatable upper portion supporting an electric generating turbine. A set of radially oriented blades rotate in a vertical plane. A control vane is mounted on a hinge bar and is movable vertically along the bar as well as bilaterally about the hinge bar, when the control vane is lifted out of a restraint well under the force of a wind vector moving in a first horizontal direction where the turbine would be counter-rotated. The control vane is pressed into the restraint well under the force of a wind vector moving in a second direction, essentially opposing the first direction. The control vane is urged to rotate laterally when lifted out of the restraint well, thereby rotating the upper tower portion until the control vane is positioned for being pressed into the restraint well so as to align the turbine blades for preferred blade rotation."

An attempt to resolve propulsion inadequacies includes the Hull U.S. Pat. No. 3,939,794 issued Aug. 10, 1976, which stated—"This invention relates to mechanically-actuated ahead-and-astern propulsion of marine vessels by means of a reversible hydraulic-jet ejector structure composed in part of oppositely-directed ejector stage disposed centrally within a longitudinal open-channel conduit formed into the hull of the vessel. The reversible ejector structure may be alternately actuated by members of an oppositely-directed pair of remotely-driven pump-jet rotor nacelles submerged within the open-channel conduit, and disposed to supply high-velocity motive fluid to their respective secondary-nozzle pair members of the oppositely-directed ejector stage. The pump-jet rotor nacelles may be remotely driven by right-angle drive shafts housed within supporting structural struts, and actuated by machinery internal to the vessel. The rotor assembly of each pump-jet nacelle may include variable-pitch blading whose operating adjustment may regulate the quantity and velocity of motive fluid supplied to its respective ejector staging."

An attempt to resolve propulsion inadequacies includes the Connolly U.S. Pat. No. 3,958,897; issued May 25, 1976, which stated—"A variable pitch propeller assembly having a shaft mounted in a housing and operably connectable to a rotary power source. A means mounted on the shaft has a propeller blade pivotally mounted therewith. The blade has a stem portion pivotally mounted in the means. A cam is rotatably mounted in the housing and has an inclined portion angularly disposed relative to the shaft. Another means is slidably mounted in the housing and positioned between the cam and the first-named means and having a cam follower engaged with the inclined portion of the cam and having a guide means oppositely disposed to the cam follower. A rotatable member is positioned between the means slidably mounted and the first-named means and it has guide means follower engaged with the guide means and members connected with the stem portion of the propeller blade. Rotation of the cam moves the slidably mounted means and the rotatable member which rotates the stem portion of the propeller blade to be rotated thus changing the pitch of the blade."

Another attempt to resolve propulsion inadequacies includes the Melkuti U.S. Pat. No. 7,281,680; issued Oct. 16, 2007, which stated—"The aircraft incorporates a single ducted propeller. The fuselage bridges over the ducted propeller assembly, and is shaped in a way that the incoming air can smoothly flow into the propeller area. The duct has an aerodynamically shaped frontal area, and an aft extension, which forms the tail section. The wings are attached to the side of the duct. The ducted propeller assembly also contains louvers, which run span wise, to redirect the outgoing air in horizontal direction. During vertical take-off or landing, the propeller has a horizontal plane of rotation, after take-off the whole craft entirely tilts forward approximately 26 degrees to transition into horizontal wing born flight. During vertical flight, the aircraft is controlled by control louvers installed inside the ducted propeller assembly in the slipstream."

None of the earlier devices overcome fuel economy problems. An engineering advance is needed to surpass the existing solutions the world relies on today. Therefore, an improvement that correctly addresses fuel savings, without adding encircling rings of material called ducts, is available with an impeller invention. Economy is a feature of a stack impeller invention. A stack impeller invention produces more volume than a propeller. Other problems exist that were not addressed by patented inventions. This device is an attempt to overcome the inadequacies of the present technology.

Utilizing the present impeller, a beneficial effect of compounding the output volume provides a proportionate reduction of rotation speed. While propellers are suitable for their intended purpose they require excessive shaft speed. When an invention converts energy by a compounding factor there is a benefit of economy. This applies to fuel savings and saves the electricity that is used to accomplish a task such as propulsion. Lower rpm equate to savings.

Historically a variety of fans utilize axial propellers, squirrel cage cylinders, and centrifugal vanes. Mechanically, a fan has revolving axial propellers, or revolving vanes to produce air movement. Squirrel cage and centrifugal flat vane fans move air outward from the center axle to an enclosure wall. This is characteristic of today's designs.

The present impeller invention relates in general to fan propellers. The present impeller device may be utilized as a way to focus and accelerate a volume of vapor or fluid. An impeller can disperse a volume or create a vacuum in the reverse direction. When attached to a generator the present invention could produce electricity from the dynamic flow of vapor or fluid.

Devices for pumping and propulsion have a variety of designs. Historically, Archimedes screws have been utilized to raise water by human power. Paddle wheels to move water were utilized by Robert Fulton, circa 1810. Propellers (screw) that move water were proven superior to the paddle wheel. In the World War II era (1940s) German U boats (Type 212 submarines) used an improved propeller. Laboratory work by Germany led to a non-cavitating solution for screw propellers. The non-cavitating design was developed to silence propellers on submarines. The trailing edge of a propeller is extended and cupped on "skewback" propellers. Today there are many boats, ships, and submarines that have the improved skewback propellers.

Currently variable pitch mechanisms are produced for boat propellers. The aquatic design is adjusted manually with the mechanism lifted out of the water on personal boats. Large ships have variable pitch mechanisms a pilot can utilize that are fluid-driven. Since skewback and adjustable pitch propellers, major advances ended.

The present invention relates in general to axial propellers for fluid propulsion. Traditionally, an "impeller" propels fluids inside pumps. The present impeller uses an advanced technology to move fluids by human or mechanical power.

In the future, the present impeller will help lower shaft speed to lessen the horsepower needed to move fluids effectively. A mechanical advantage is obtainable. The present stack impeller produces thrust effectively and quietly without cavitation problems.

It is an objective of the stack impeller to decrease noise and be utilized in multiple adaptations. The present invention can be made tiny or big to conquer engineering problems.

An additional objective is to be fabricated by existing machinery with minor modifications and assembled inexpensively. Material can be natural or man-made.

SUMMARY

The aforementioned, and other objects were achieved, plus the above-mentioned disadvantages overcome by the stack impeller invention; providing a fundamental product for engineered solutions to short-comings of current designs.

The present impeller invention is directed to propelling or drawing up vapor or fluid substances; plus to generate power for use when positioned on a dynamo apparatus.

In a preferred embodiment, the conical/cylindrical impeller comprises dynamically balanced components and/or a sheet of material with open louvers which deflect vapor or fluid to the center and eject it out the open base, in a considered configuration.

In another embodiment of an impeller invention, the primary cone comprises at least one additional cone positioned on a drive axle is preferred.

In an additional embodiment, at least one slanting, circular structure focuses flow to pass it to an additional cone or cones is preferred.

In a final embodiment of the impeller invention the primary cone/cylinder has at least one additional level positioned concentrically at an engineered distance.

The present vapor-based impeller invention, utilizing inflowing vapor, is directed to a multi-use, volume focusing or diffusing, reversible device that rotates to generate electrical power if positioned on a dynamo apparatus; applying a technology advance. This applies to steam.

The present fluid-based impeller invention, utilizing inflowing fluid, is directed to a multi-use, volume focusing or diffusing, reversible device that rotates to generate electrical power if positioned on a dynamo apparatus; applying a technology advance.

Additional objects and advantages of the present impeller invention set forth in part in the descriptions which follow, will be obvious from the description, or may be learned by practice of the impeller invention. Objectives and advantages of the present stack impeller device will be obtained by means of instrumentalities in combinations, particularly in the attached claims (appended) positioned at the end of this document.

BRIEF DESCRIPTION OF THE DRAWINGS

The accompanying drawings illustrate multiple complete embodiments of the present invention; and of others, according to the best modes so far devised for the practical application of the principles thereof, and in which:

FIG. 15 shows a partial cross-section detail of said conical stack with a motor on a power shaft and a cross-section of overlapping cones, according to an embodiment of the present stack impeller invention.

DETAILED DESCRIPTION OF THE INVENTION AS PREFERRED EMBODIMENTS

The drawings show aspects of the present impeller invention utilizing component portions. As the drawings are described, reference will be made to the present preferred embodiments of the present invention. Terminology used herein to describe the present preferred embodiments is for the purpose of clarification. The invention, however, is not intended to be limited to specific terminology used. Terminology used to describe each element should be understood to include all technical equivalents that operate in a corresponding manner to accomplish similar functions.

The present stack impeller is described in relation to vapor and fluid movement devices. These materials are considered to be used in practice. Characteristics and parameters pertain to various embodiments of the devices and methods described herein, may be applicable for other uses. Use as a turbine to turn a generator is considered a reverse operation of the device.

Figure 1:
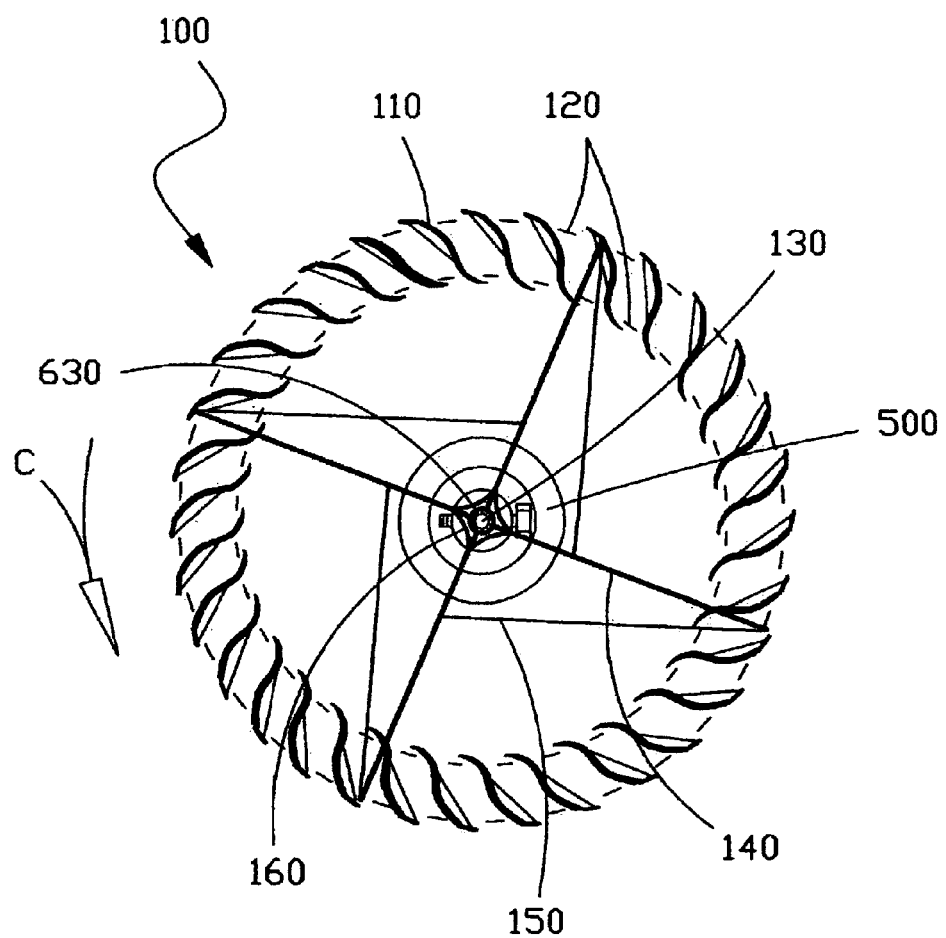
FIG. 1 shows an operation detail of one plane of a deflector panel assembly; a method of practice assembling an embodiment of the present invention.

Referring to FIG. 1, shows an operation detail in plan view of one plane/slice of the present stack impeller 100, comprising a deflector panel portion 110, tubular positioning hoops 120, a power axle 130, device power tube 630, mounting base 500, at least one tubular frame segment 140, at least one non-corrosive tension cable 150, at least one torsion-braced cross coupling 160; according to an application of the present stack impeller invention.

Figure 2:
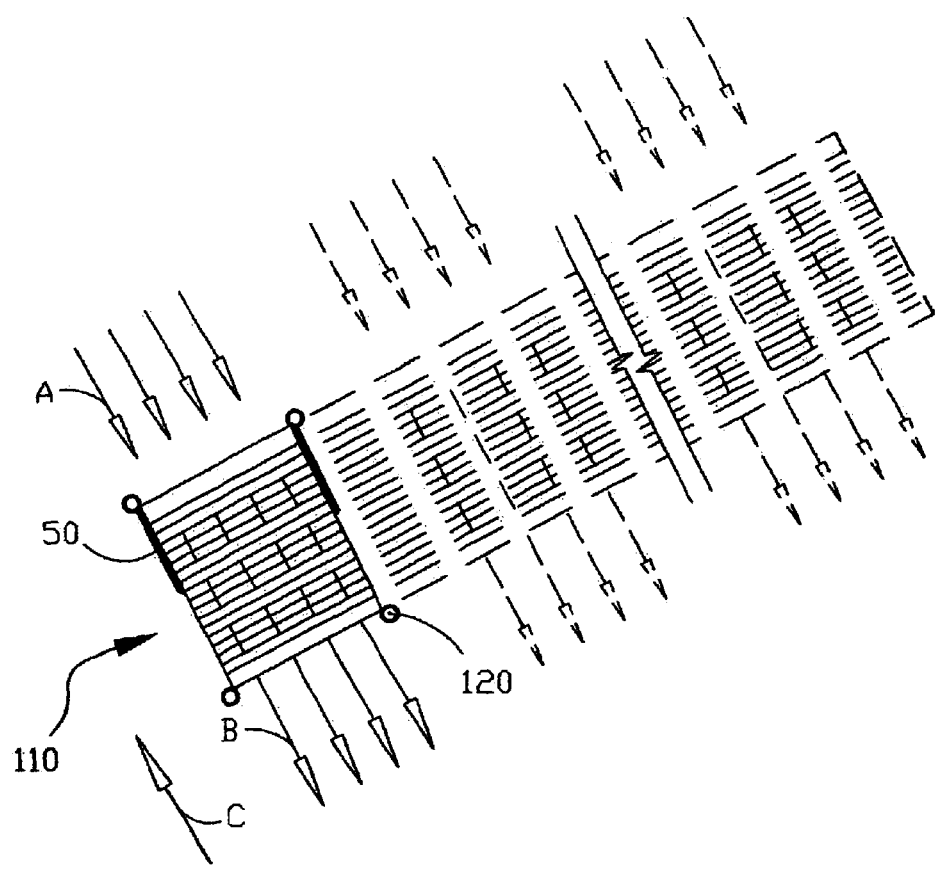
FIG. 2 shows a plan view. In this embodiment a deflector panel portion of a stack impeller is shown, according to the present invention.

Referring to FIG. 2, an embodiment of the present stack impeller 100 is shown as the deflector panel portion 110 and anti-dispersion shields 50. In this embodiment, said impeller stack A, in a considered configuration is further comprised of tubular positioning hoops 120. Arrow symbols show surrounding vapor or fluid, arrow A, is pushed by deflection to the open center arrow B. Rotation arrow symbol C is directed to clockwise or counter-clockwise. This embodiment is considered to be used in practice of the present stack impeller.

Figure 3:
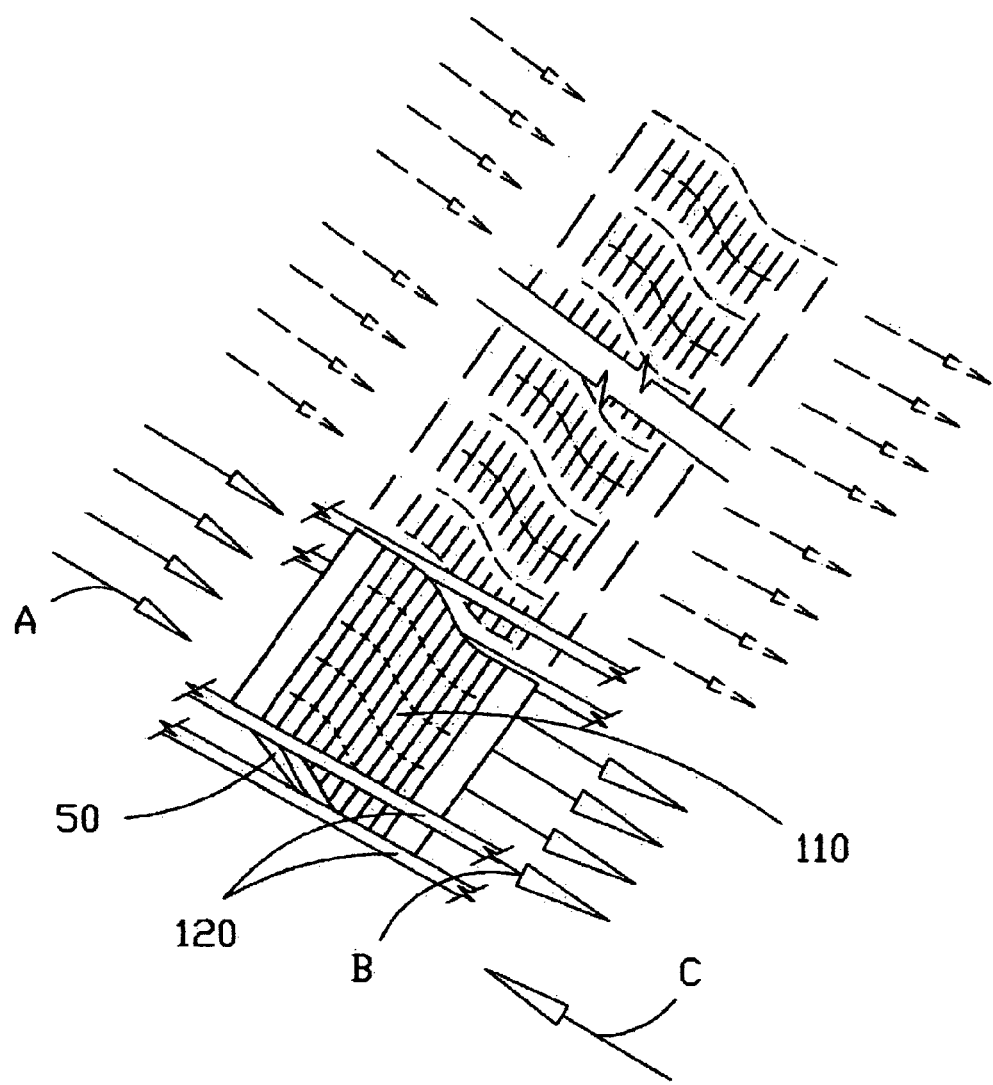
FIG. 3 shows a perspective view of the deflector panel section with the expanded panel portion, according to an embodiment of the present stack impeller invention.

Referring to FIG. 3, shows a perspective view of said deflector panel 110, the anti-dispersion shields 50, said tubular positioning hoops 120, comprising surrounding vapor or fluid, arrow A, is deflected into the open center, arrow B, when rotated, arrow symbol C, of the present stack impeller invention.

Figure 4:
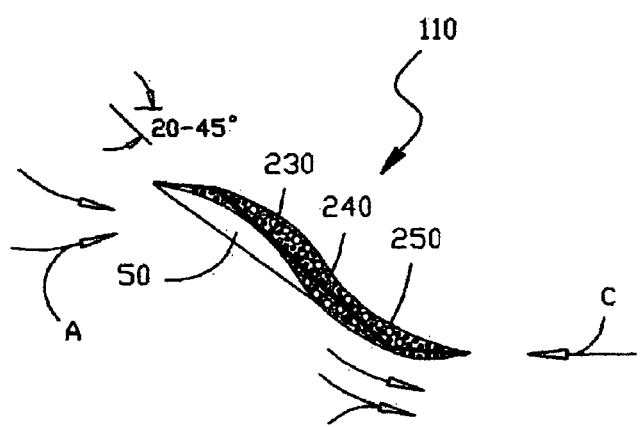
FIG. 4 shows a section detail of said panel portion with multiple considered profile details, according to an embodiment of the present stack impeller invention.
Figure 4A:
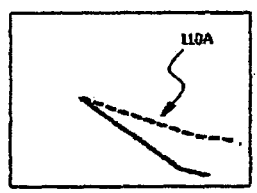
Figure 4B:
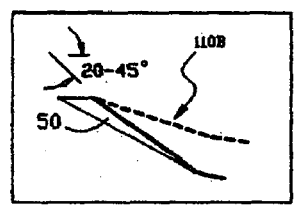
Figure 4C:
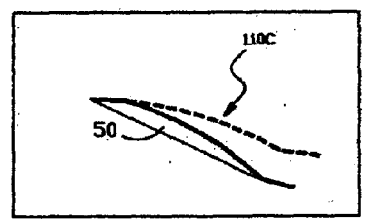

Referring now to FIG. 4, shows a cross-section of deflector panel portion 110, a non-corrosive perforated core 230, said anti-dispersion shields 50, dense filler foam 240, and multiple profiles (see FIGS. 4A, 4B, 4C) of considered panel portions 110A, 110B, 110C, are shown. One embodiment FIG. 4 comprising cover layer 250 is shown. These materials are considered to be used in practice of the present stack impeller.

Figures 5, 5A:
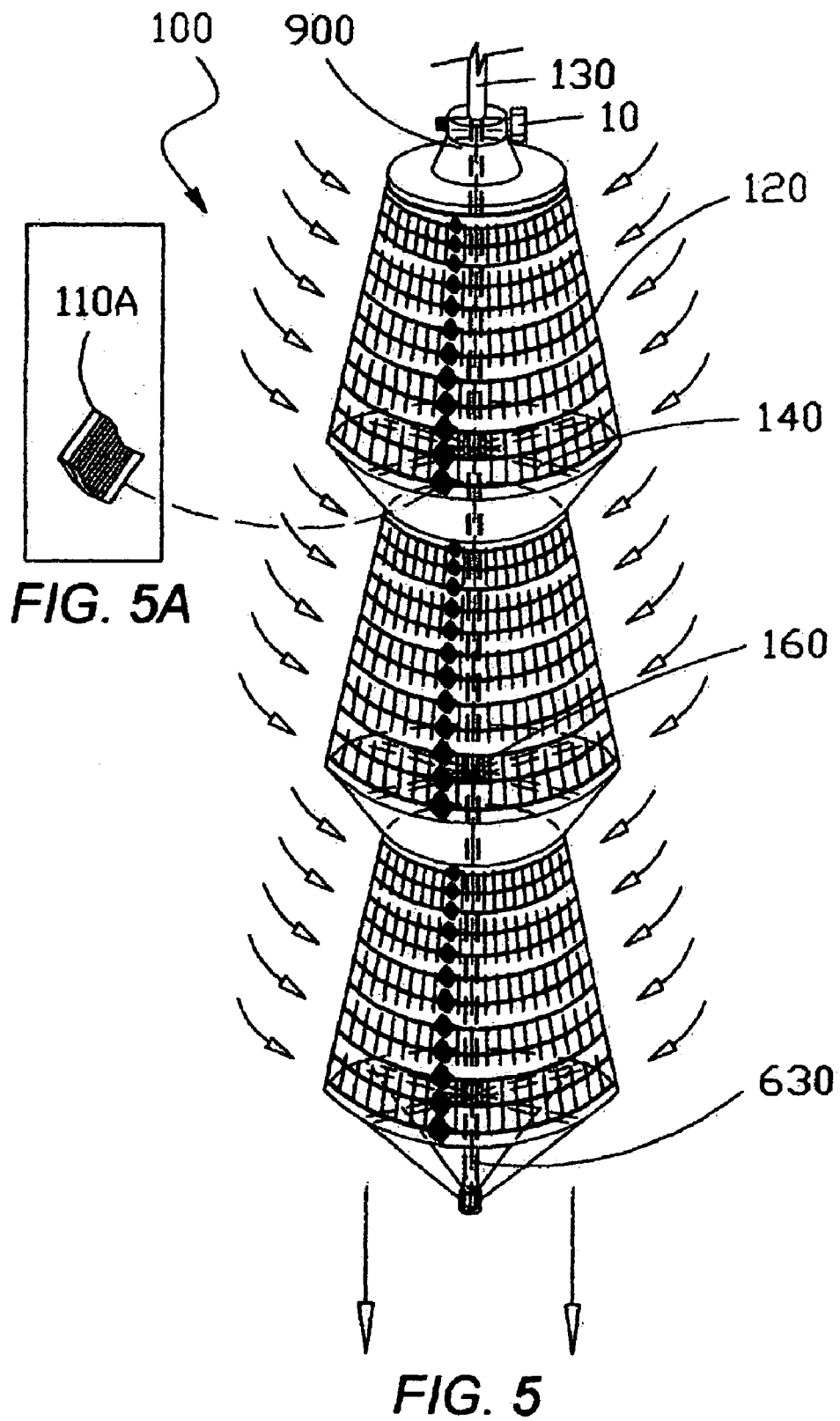
FIG. 5 shows a perspective detail and a perspective view of a conical/cylindrical stack impeller with the panel portions, according to an embodiment of the present impeller invention.

Referring now to FIG. 5, shows a perspective view of the present stack impeller 100, and a perspective detail FIG. 5A of an extended panel portion 110A, power axle 130, device power tube 630, mounting base 900, at least one securing device 10, tubular positioning hoops 120, tubular frame segments 140, torsion-braced cross couplings 160, of the present invention.

Figures 6, 6A:
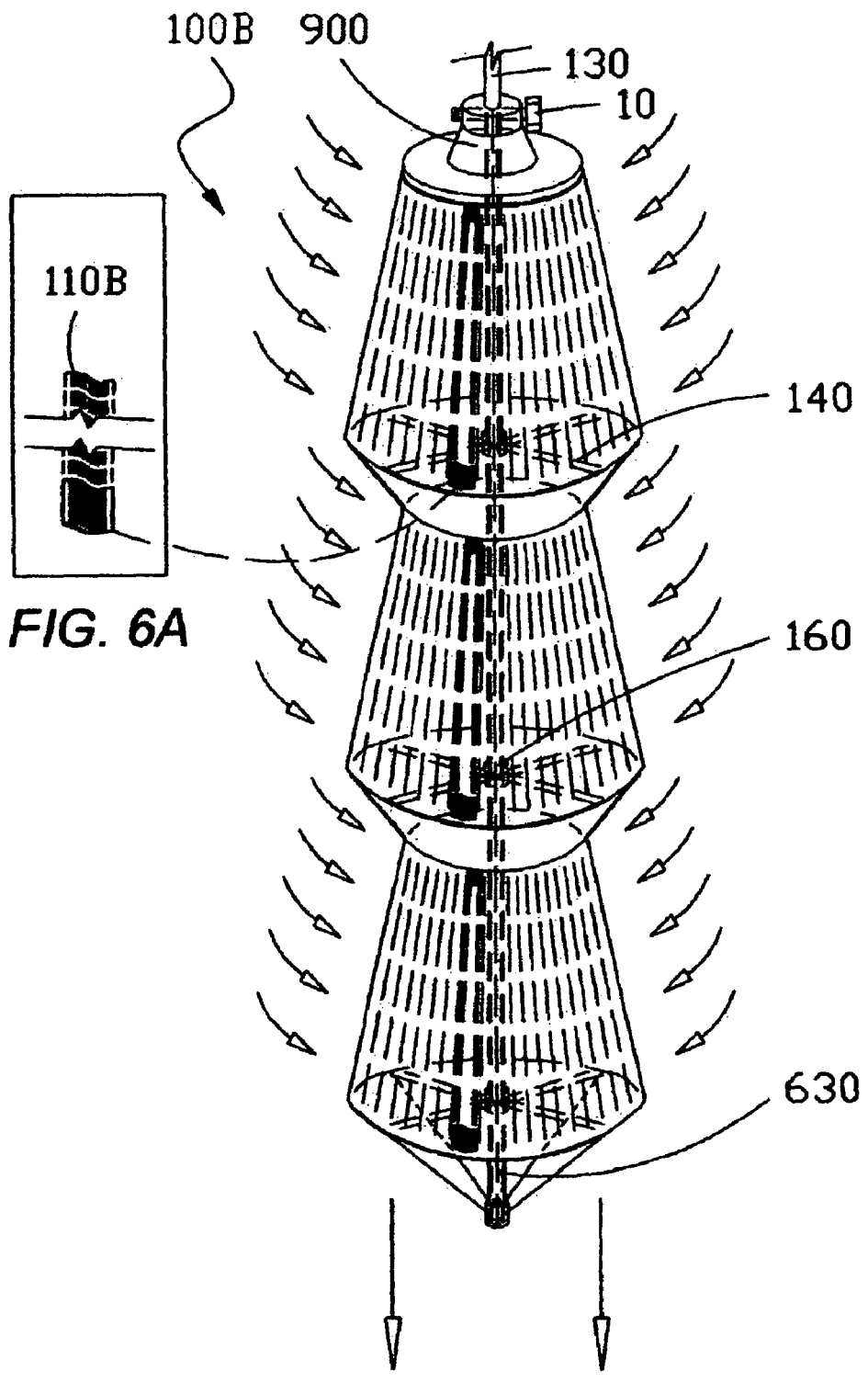
FIG. 6 shows a deflector panel detail and a perspective view of a conical/cylindrical stack impeller with expanded panel portions, according to an embodiment of the present impeller invention.

Referring now to FIG. 6, shows a perspective view of the present stack impeller 100B, and a perspective detail FIG. 6A of an extended panel 110B, power axle 130, power tube 630, mounting base 900, said securing devices 10, tubular frame segments 140, torsion-braced cross couplings 160, of the present stack impeller invention.

Figures 7, 7A:
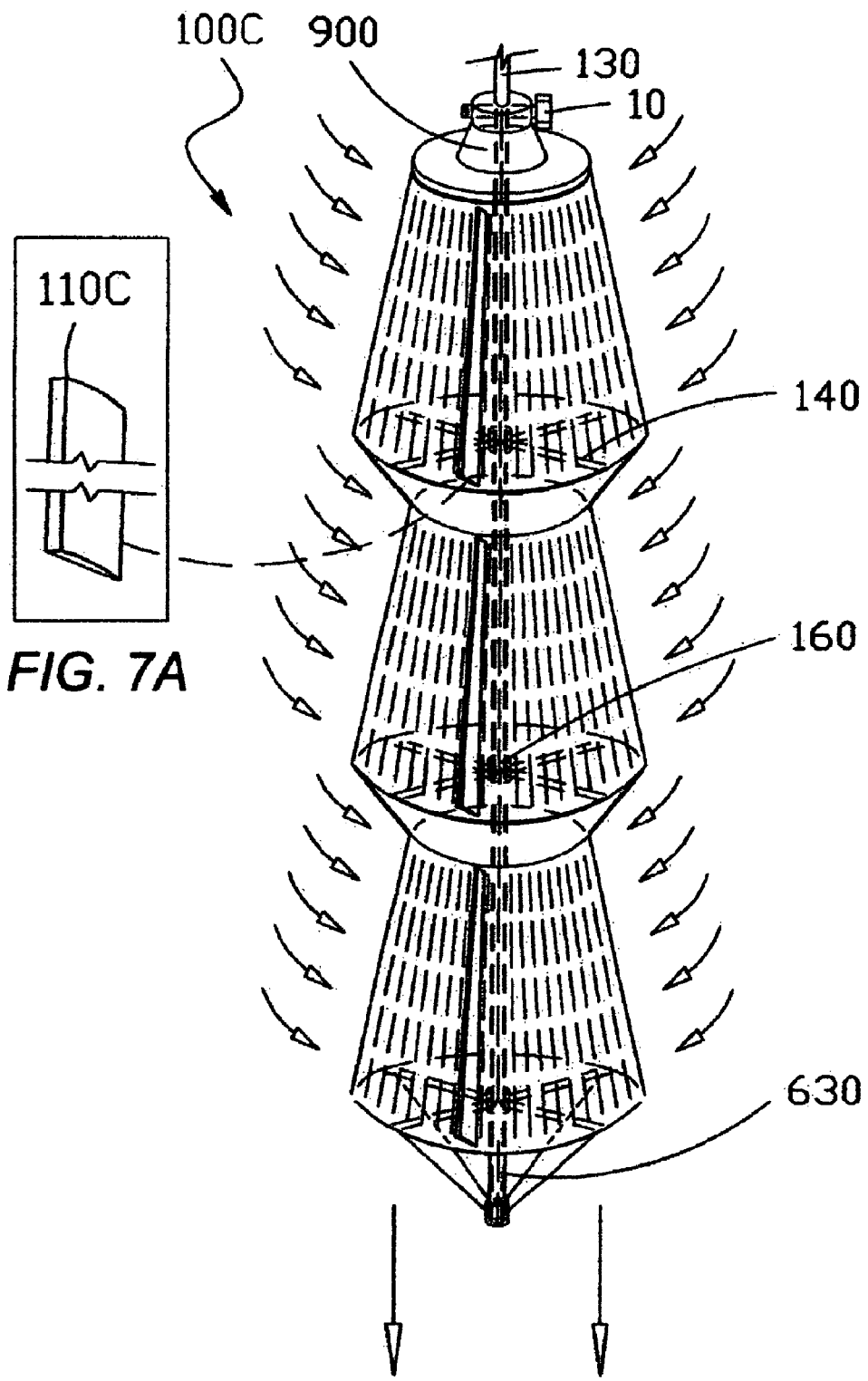
FIG. 7 shows an expanded curved deflector panel detail and a perspective view of a conical/cylindrical stack impeller with panel portions, according to an embodiment of the present impeller invention.

Referring now to FIG. 7, shows a perspective view of the present stack impeller 100C, and a perspective detail FIG. 7A of an extended panel 110C, power axle 130, device power tube 630, mounting base 900, the securing devices 10, tubular frame segments 140, torsion-braced cross couplings 160, of the present stack impeller invention.

Figure 8A:
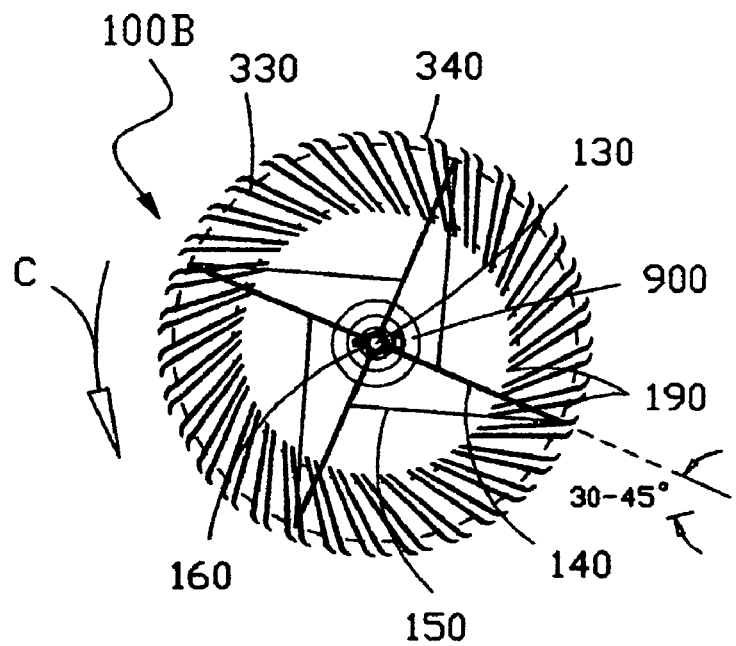
FIG. 8 shows an operation detail of one plane of an assembly with tapering and curved tubular portions; a method of practice assembling an embodiment of the present stack impeller invention.
Figure 8B:
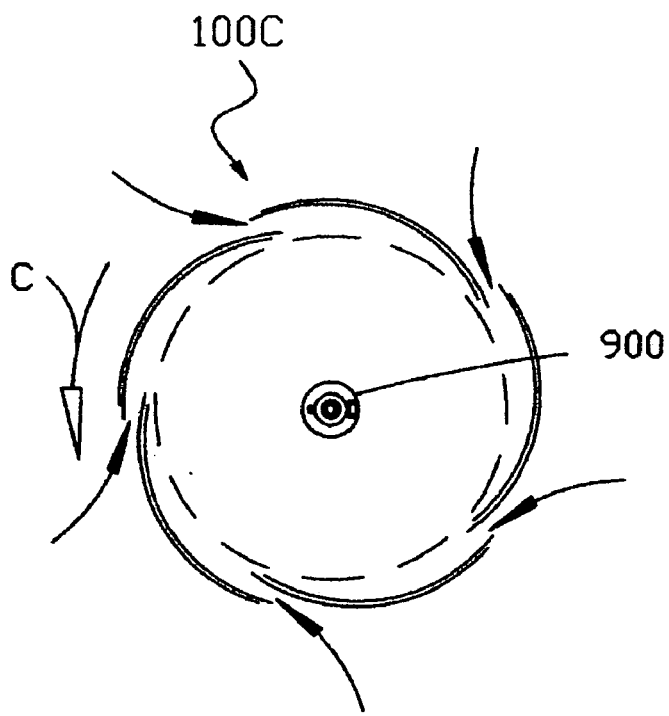

Referring now to FIG. 8A, shows a considered operation detail of one plane of the present stack impeller 100B, tapering, curved cylinder portion 330, half-dome tube end 340, conical/cylindrical positioning sheet material 190, power axle 130, mounting base 900, tubular frame segment 140, non-corrosive tension cable 150, torsion-braced cross coupling 160; and referring now to FIG. 8B, shows a considered operation detail of one plane of the present stack impeller 100C', according to considered applications of the present stack impeller invention.

Figure 9:
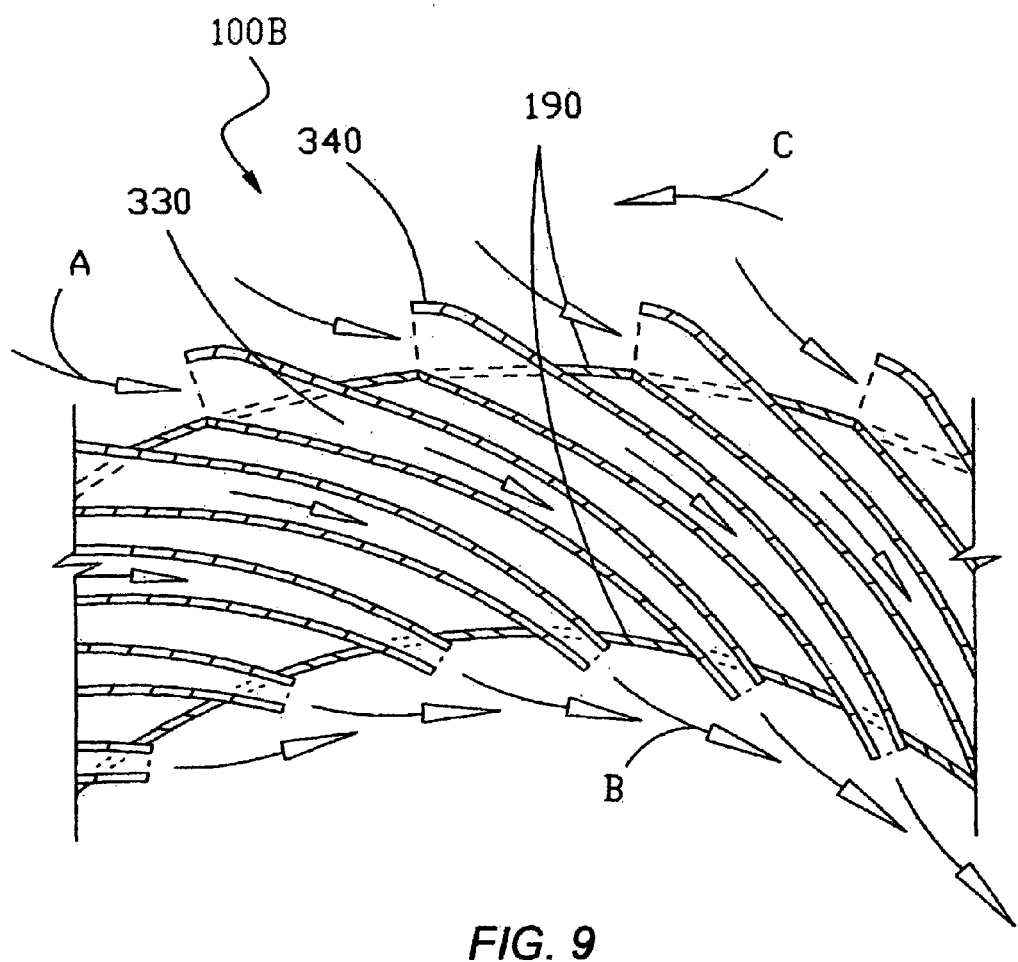
FIG. 9 shows a partial cross-section of said tapering and curved tubular portions, according to an embodiment of the present stack impeller invention.

Referring now to FIG. 9, shows a partial section of one level/plane of the present stack impeller 100B, tapered, curved cylinder portion 330, said half-dome tube end 340, the conical/cylindrical sheet material 190; considered to be used in practice of the present impeller.

Figure 10:
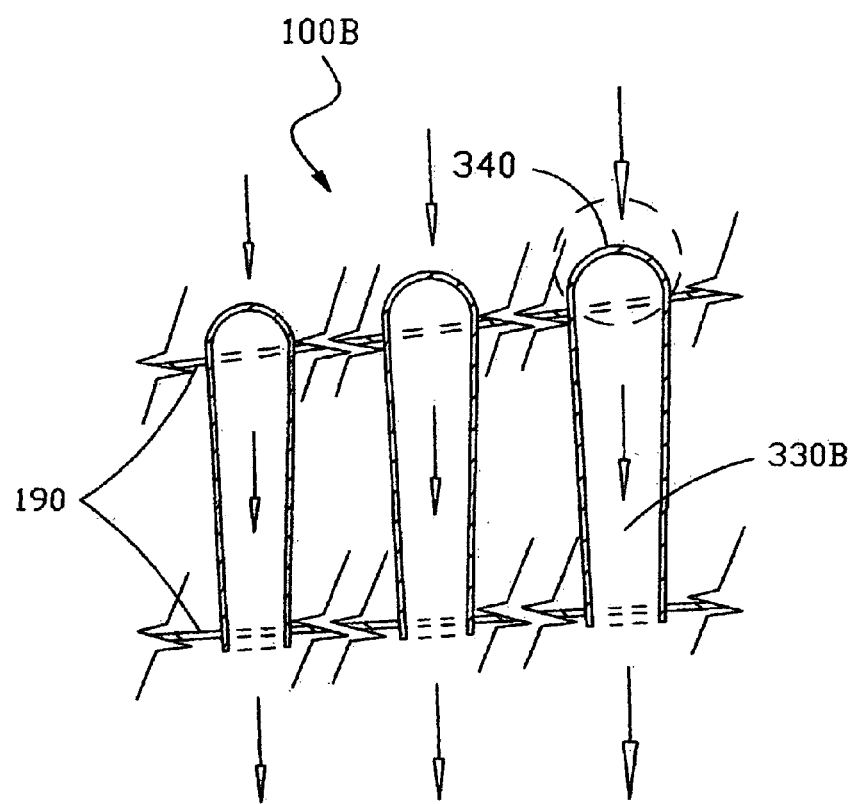
FIG. 10 shows a partial longitudinal section of the tapering and curved tubular portions, according to an embodiment of the present stack impeller invention.

Referring now to FIG. 10, shows a partial longitudinal section of impeller cone 100B, tapered cylinder portion 330B, half-dome tube end 340, said conical/cylindrical sheet material 190; considered to be used in practice of the present stack impeller.

Figure 11:
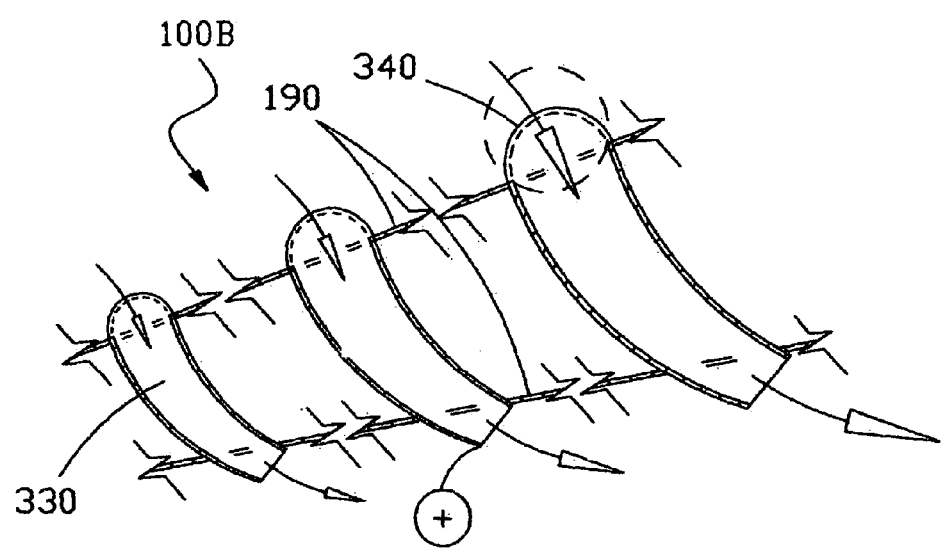
FIG. 11 shows a partial longitudinal section of said tapering and curved tubular portions, according to an embodiment of the present stack impeller invention.

Referring now to FIG. 11, shows a partial longitudinal section of impeller 100B, tapered, curved tubular portion 330, half-domed tube end 340, said conical/cylindrical sheet material 190; considered to be used in practice of the present stack impeller. Note: (+) symbol in circle—tapered, curved tubular portion 330 discharges out the open end of impeller cone 100.

Figure 12:
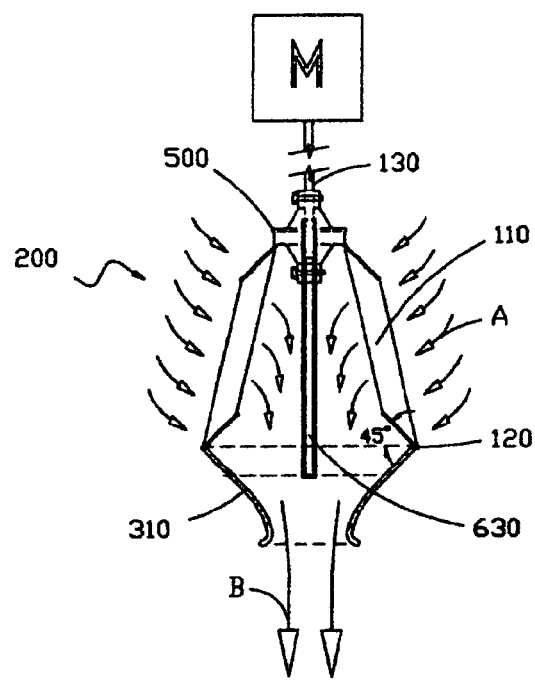
FIG. 12 shows multiple cross-section details to clarify the volume output by length of said conical stack, according to an embodiment of the present stack impeller invention.
Figure 12A:
Figure 12B:
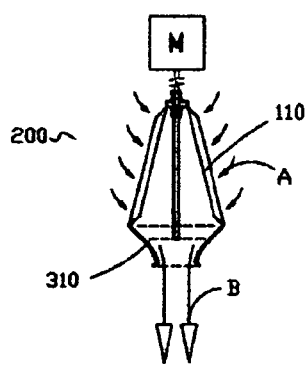
Figure 12C:
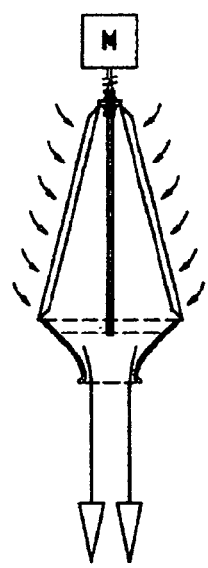

Referring now to FIG. 12, shows an enlarged cross-section detail and multiple configurations, FIGS. 12A, 12B, and 12C, of multiple length embodiments, of an impeller cone 200, a structural configuration of slant-sided, circular material 310, power axle 130, mounting base 900, device power tube 630, motor M; considered to be used in practice of the present stack impeller.

Figure 13A:
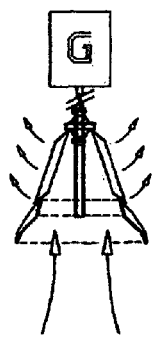
FIG. 13 shows three cross-section details of multiple stack impellers with proportion changes, according to embodiments of the present stack impeller invention.
Figure 13B:
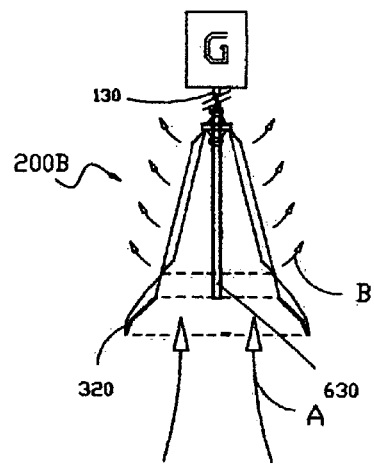
Figure 13C:
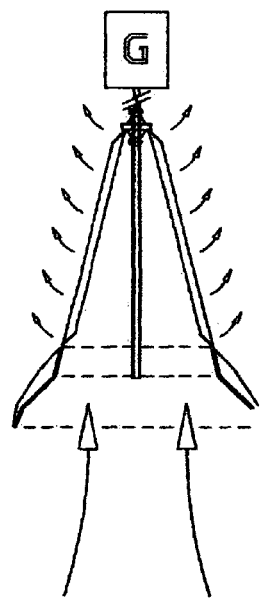

Referring now to FIG. 13, shows multiple length cross-section embodiments FIGS. 13A, 13B, and 13C, of an impeller cone 200B, collecting configuration of slant-sided circular material 320, the power axle 130, device power tube 630, a dynamo generator G; considered to be used in practice of the present invention.

Figure 14:
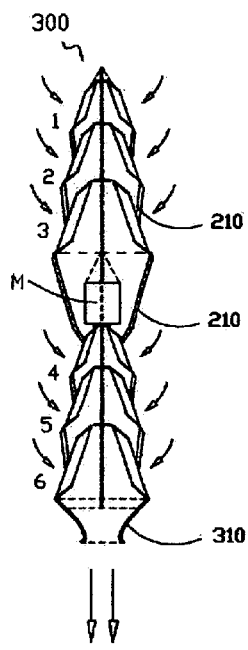
FIG. 14 shows a partial cross-section detail of said conical stack invention on a power shaft and a cross-section of a multiple cone stack, according to an embodiment of the present stack impeller invention.
Figure 14A:
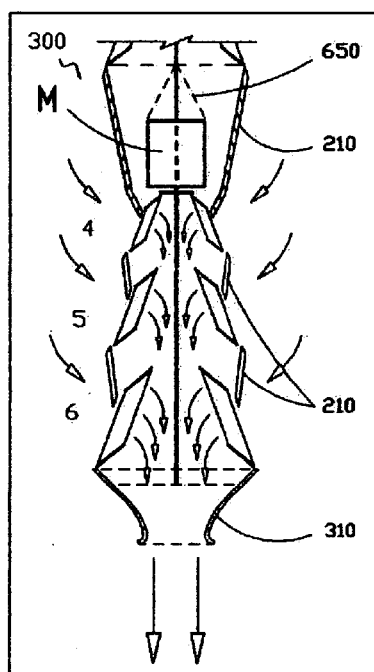
Figure 14B:
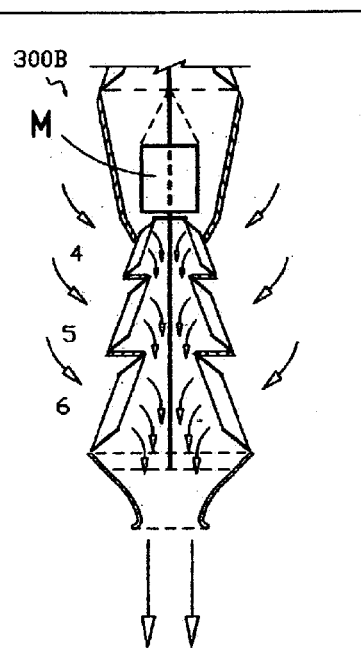

Referring now to FIG. 14, shows a cross-section of stacked impellers 300 and two partial cross-section details FIG. 14A, shows a partial cross section of impeller 300, and referring now to FIG. 14B, shows a partial cross section of impeller 300B, comprising a power axle 130, motor M, comprising slant-sided, circular material 210 (in various configurations), configuration of slant-sided circular material 310, flow deflecting cone 650; considered to be used in practice of the present stack impeller invention.

Referring now to FIG. 15, shows a cross-section of an extended embodiment and a partial cross-section detail and referring now to FIG. 15A, comprising overlapping stack impellers 400, configuration of slant-sided circular material 310, the power axle 130, said motor 1W, said circular material 210 in various configurations; flow deflecting cone 650; considered to be used in practice of the present stack impeller invention.

Figure 16:
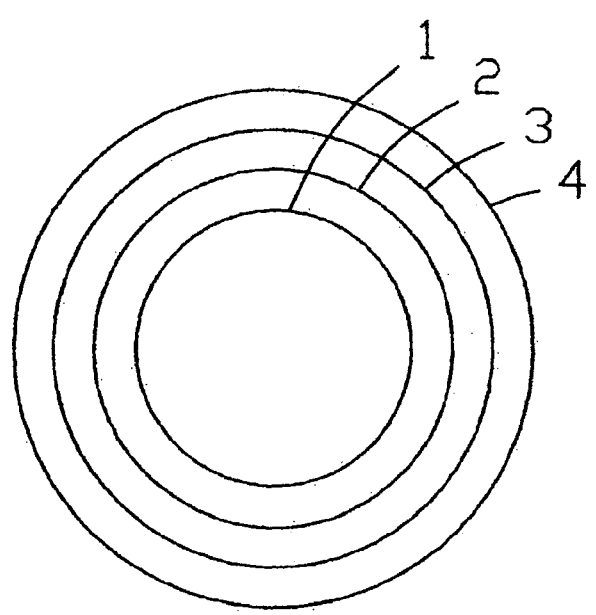
FIG. 16 shows a plan view of concentric levels, according to an embodiment of the present stack impeller invention.

Referring now to FIG. 16, shows a plan view of concentric levels, according to an embodiment of the present stack impeller invention.

Figure 17B:
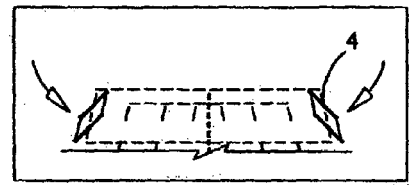
FIG. 17 shows a cross section detail of a stack impeller with multiple concentric levels and multiple cross-sections to define each level, according to an embodiment of the present invention.
Figure 17A:
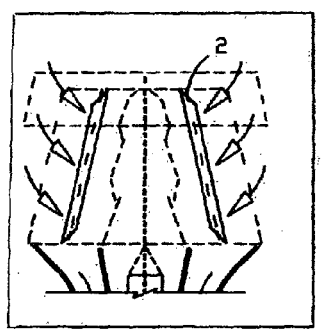
Figure 17C:
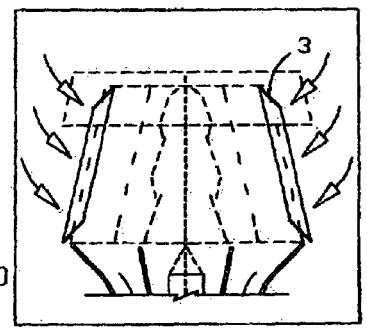
Figure 17:
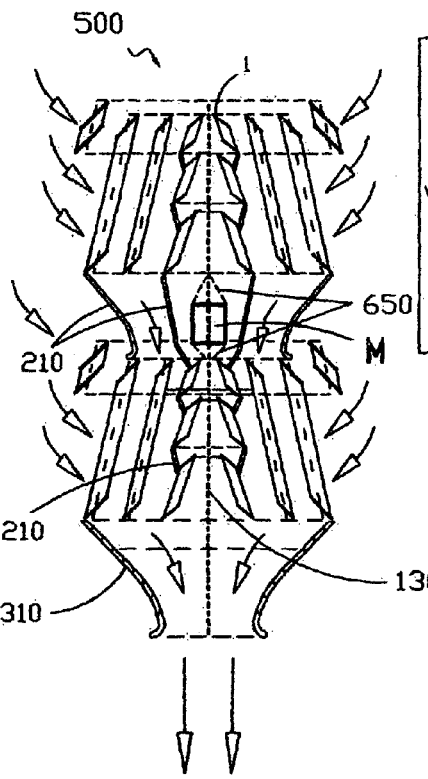

Referring now to FIG. 17, shows cross-section details of considered additional concentric levels FIGS. 17A, 17B, 17C, at a fixed distance from stack impeller 500, at least one deflecting cone 650, slant-sided circular members 210 (in various configurations), configuration of slant-sided circular material 310, the power axle 130, said motor M; considered to be used in practice of the present stack impeller invention.

Figure 18B:
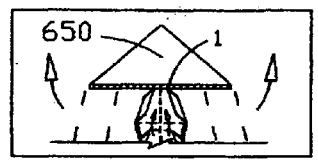
FIG. 18 shows a cross section detail of a stack impeller with multiple concentric levels and multiple cross-sections to define each level, according to an embodiment of the present invention.
Figure 18A:
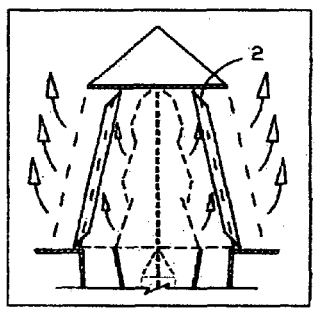
Figure 18:
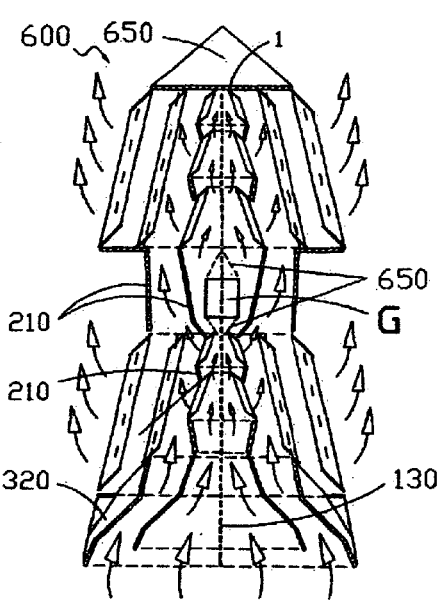
Figure 18C:
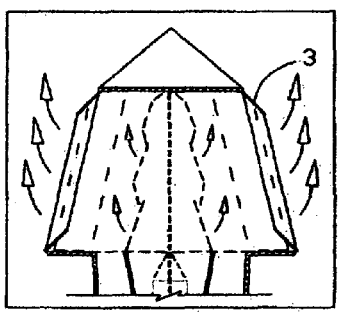
Figure 18D:
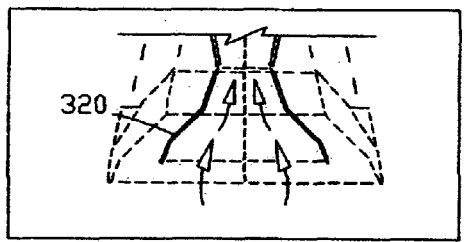
Figure 18E:
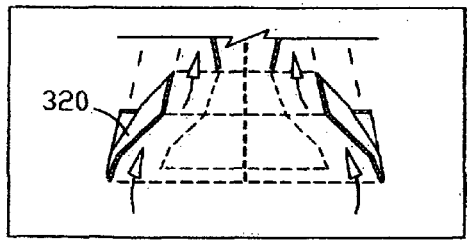

Referring now to FIG. 18, shows multiple scenarios FIGS. 18A, 18B, 18C, 18D, 18E, with considered additional concentric levels at fixed distances from stack impeller 600, slant-sided circular members 210 (in various configurations), at least one collecting configuration of slant-sided circular material 320, at least one deflecting cone 650, said power axle 130, said dynamo generator G; considered to be used in practice of the present stack impeller invention.

Figure 19:
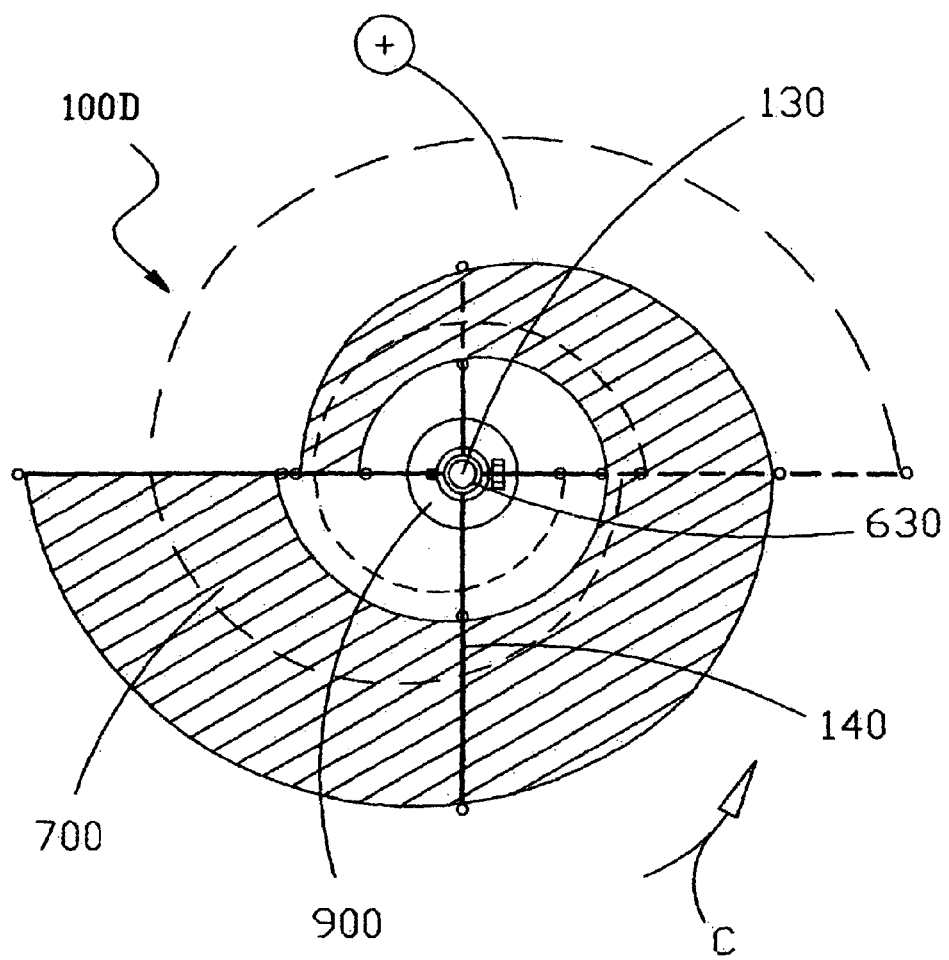
FIG. 19 shows an operational view of a spiral impeller according to an embodiment of the present impeller invention.

Referring now to FIG. 19, shows an operation view of spiral impeller 100D, comprising at least one spiral member 700, power axle 130, device power tube 630, mounting base 900, tubular frame segments 140, of the present stack impeller invention. Note: (+) symbol in circle—considered additional spiral member 700.

Figure 20:
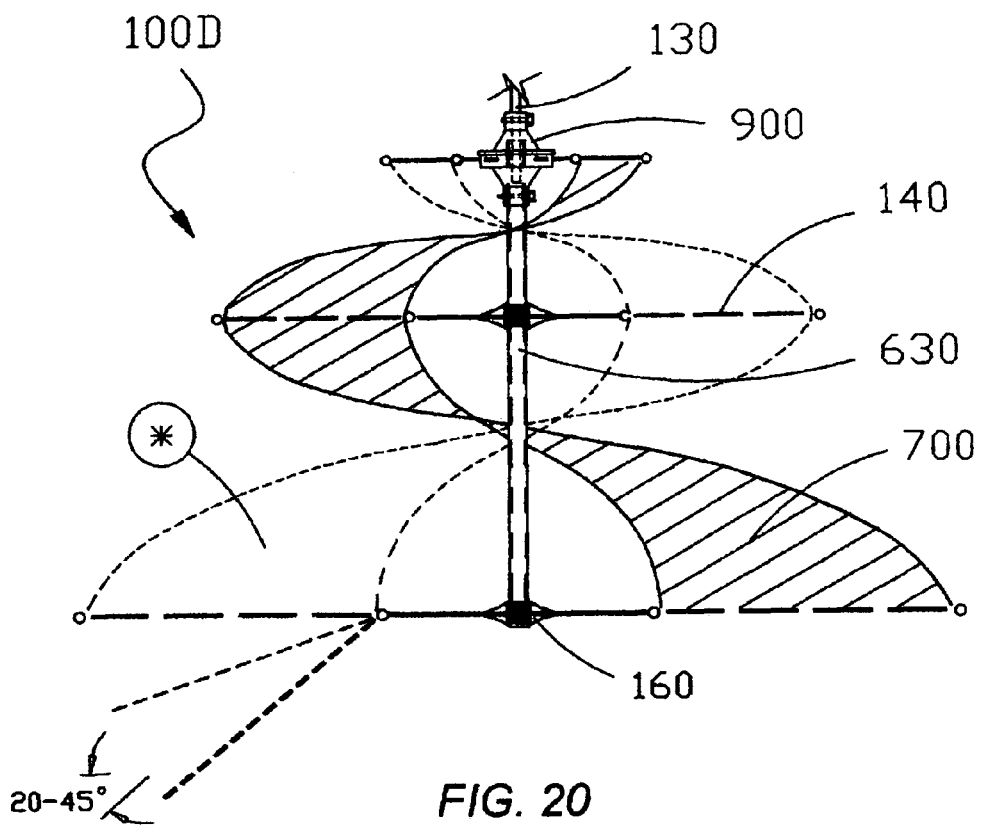
FIG. 20 shows a side view of said spiral impeller according to an embodiment of the present invention.
Figure 20A:
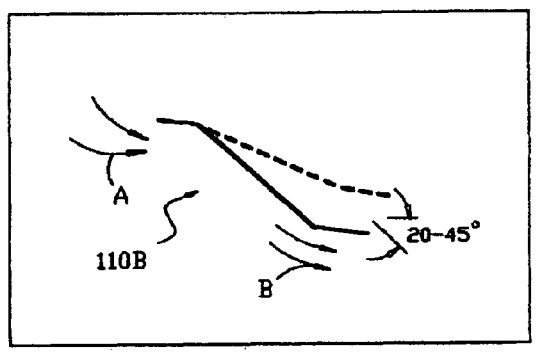

Referring now to FIG. 20, shows a side view of said spiral impeller 100D, comprising at least one spiral member 700, power axle 130, device power tube 630; mounting base 900, tubular frame segments 140, torsion-braced cross coupling 160, and a section detail FIG. 20A of said spiral member 700, of the present stack impeller invention. Note: (*) symbol in circle—considered an additional spiral member 700.

Figure 21:
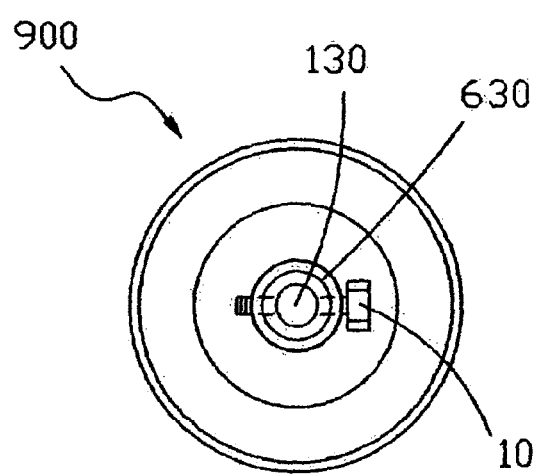
FIG. 21 shows an operational view of a mounting base according to an embodiment of the present stack impeller invention.

Referring now to FIG. 21, shows an operation view of the mounting base 900, power axle 130, device power tube 630, at least one securing device 10; according to an embodiment of the present stack impeller.

Figure 22:
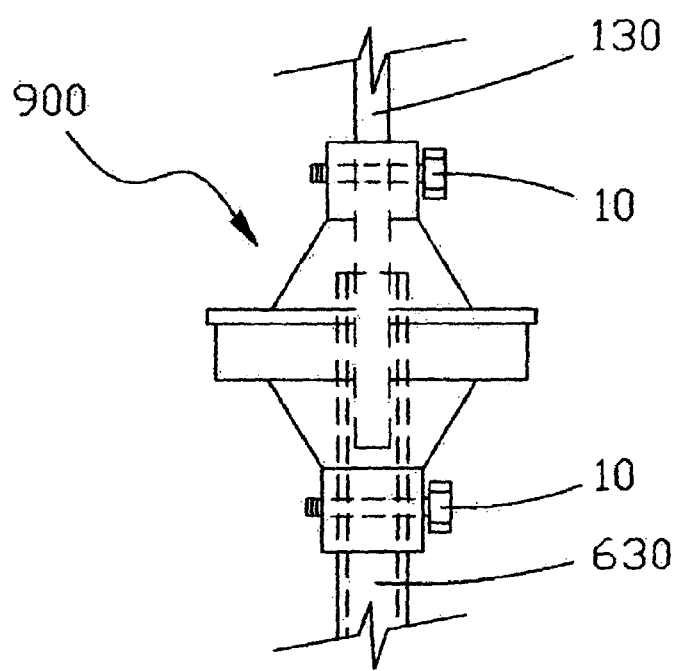
FIG. 22 shows a side view of the mounting base according to an embodiment of the present conical stack invention.

Referring now to FIG. 22, shows a side view of said mounting base 900, power axle 130, device power tube 630, said securing device 10; according to an embodiment of the present stack impeller.

The specification or preferred process of making the present device for vapor and fluid movement is as follows:

Create component casting forms, machine material for components and make adjustable alignment frames to applicable specifications Assemble impeller components to perform according to design Initiate quality checks to disclose manufacturing mistakes Find balance flaws and fix centrifugal problems from manufacturing Certify the quality then release units for distribution Alternative embodiments comprising uses of the present invention will be apparent to those skilled in the art; from consideration of the specifications and practice of the invention disclosed herein. Specifications and examples should be considered exemplary only.

What is claimed is:

1. A rotatable impeller, comprising:
   a hollow, conical and/or cylindrical, stackable component connected to the tubular power axle, the stackable component having a first open end;
   a plurality of stack portions of the stackable component that are concentrically positioned at a fixed distance from the tubular power axle in at least one level of the stackable component;
   a mounting disc that forms a frustum plane at a second smaller end of the stackable component and that is attached to the stackable component, the tubular power axle projects through the mounting disc;
   at least one structural tube that radially connects the tubular power axle to the stackable component;
   at least one torsion-braced cross-coupling that positions at least one structural tube with respect to the tubular power axle; and
   an attachment device that connects the at least one structural tube to the stackable component.

2. The rotatable impeller of claim 1, further comprising a funnel having a circular structure attached to the open end of the stackable component, the funnel increasing in cross-section away from the mounting plate and producing a focused thrust to propel vapor and/or fluids to maximum velocity, and/or creating a vacuum, in use.

3. The rotatable impeller of claim 1, further comprising a slant-sided funnel secured to the open end of the stackable component; the funnel increasing in cross-section away from the mounting plate, and gathering vapor, and/or fluid flow for operating a generating device using kinetic energy of inflowing vapor, and/or fluid, in use.

\* \* \* \* \*